May 23, 1939.  G. S. SCHMIDT  2,159,831
TIRE CHAIN
Filed July 21, 1938   2 Sheets—Sheet 1
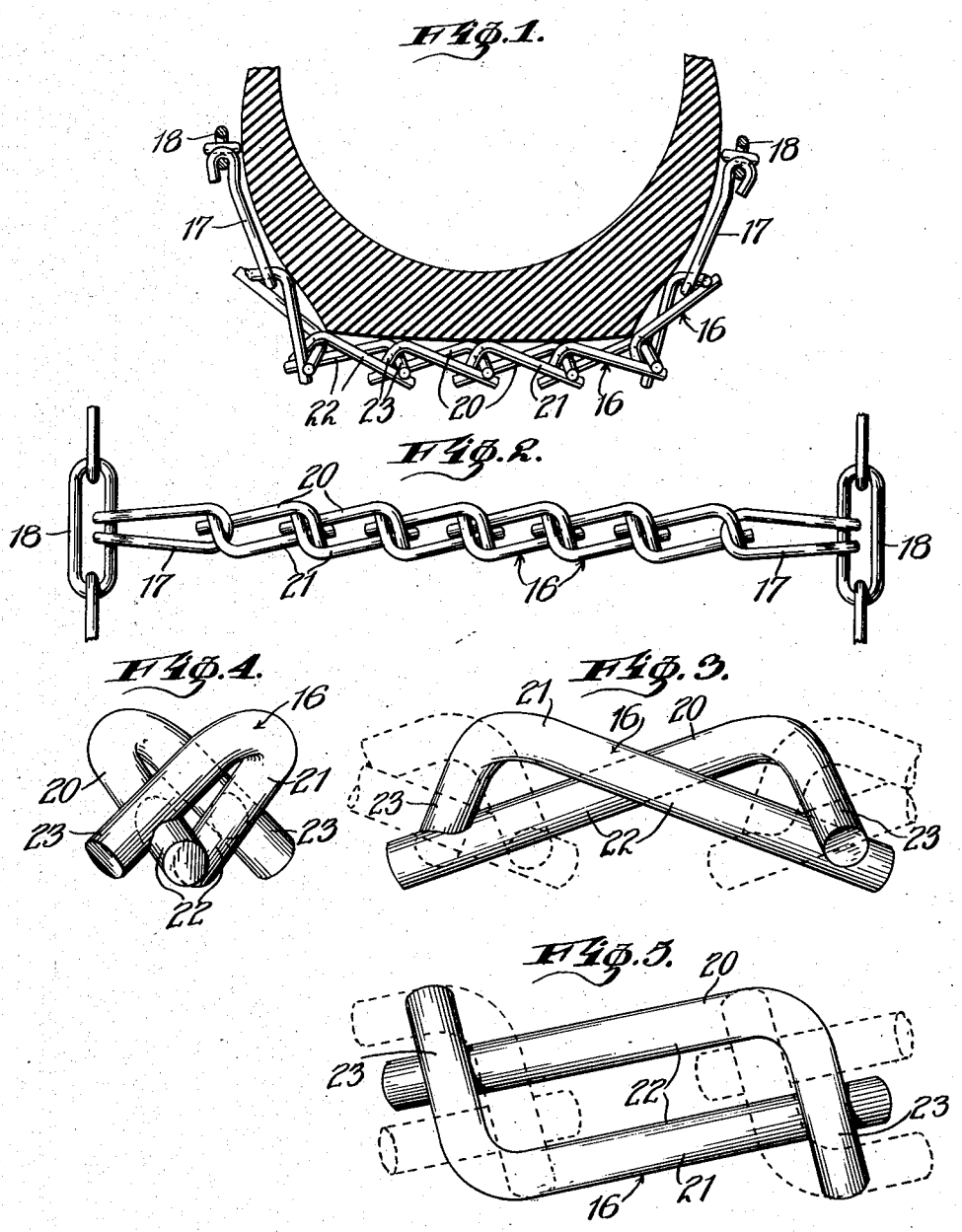
INVENTOR
GEORGE SMALL SCHMIDT
BY
ATTORNEY

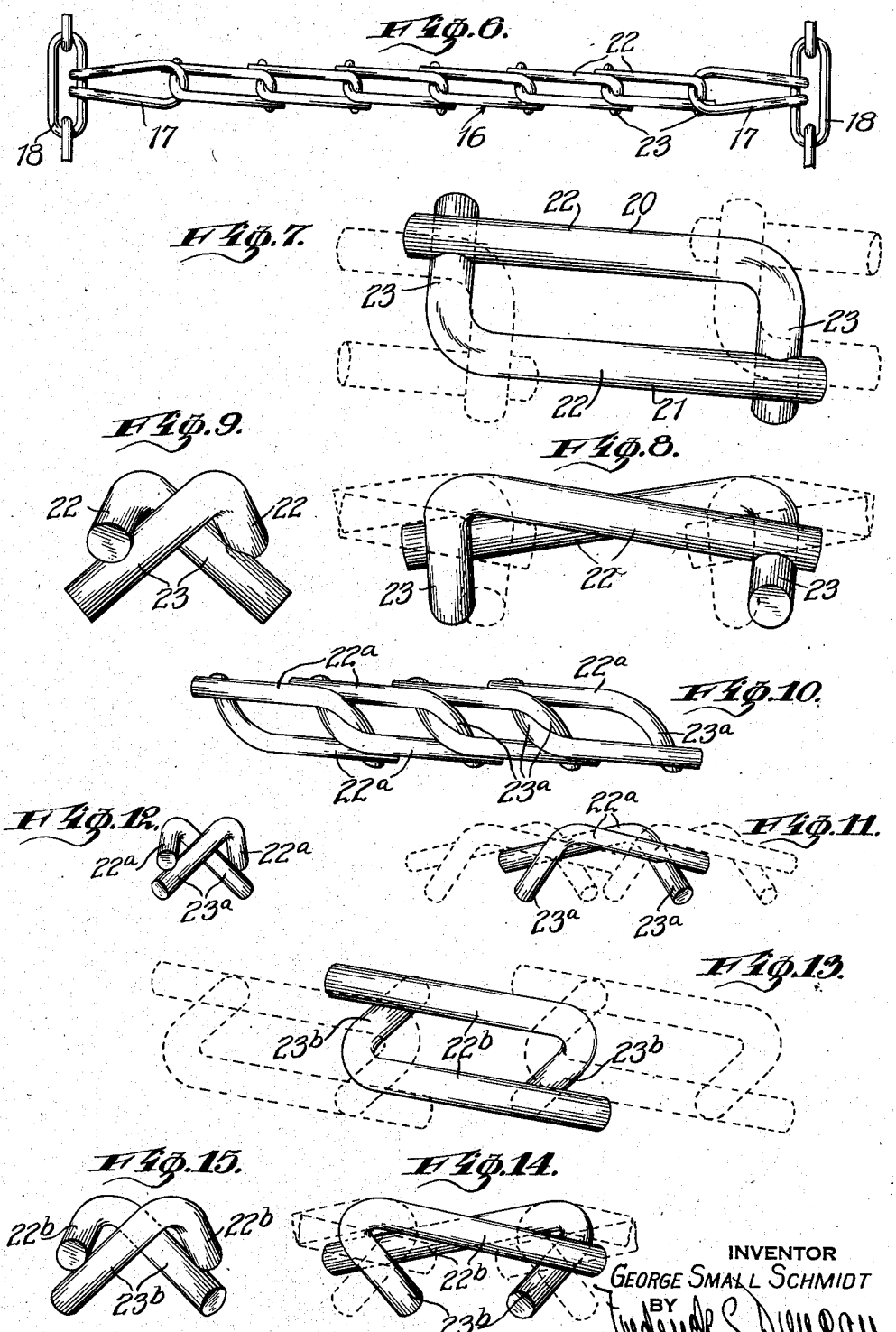

Patented May 23, 1939

2,159,831

UNITED STATES PATENT OFFICE 2,159,831

TIRE CHAIN

George Small Schmidt, York, Pa., assignor to American Chain & Cable Company, Inc., New York, N. Y., a corporation of New York Application July 21, 1938, Serial No. 220,415

17 Claims. (Cl. 152—243)

This invention relates to tire traction and anti-skid chains and more particularly to tire cross chains.

Among the objects of my invention is the provision of a reinforced cross chain which is relatively light and which is cheap to manufacture and which is extremely effective to increase traction and to resist skidding.

One of the main objects of my invention is the provision of a tire chain link comprising two simply formed parts having their ends crossed and secured together to constitute traction and anti-skid devices.

Another object of the invention is the provision of a cross chain which simulates in appearance and function the conventional cross chain of twisted links and in which the ends of the component parts of each link preferably diverge downwardly to effectively function as traction and anti-skid devices.

Other various objects will appear from the following description taken in connection with the drawings in which, Fig. 1 shows a portion of a tire in cross section with a cross chain consisting of links constructed in accordance with my invention held in position on the tire by side chains;

Fig. 2 is a top plan view of the improved cross chain shown in Fig. 1;

Fig. 3 is a side view of a portion of the cross chain shown in Fig. 1, but on a larger scale;

Fig. 4 is an end view of the link used in the construction shown in Fig. 1;

Fig. 5 is a top plan view of the portion of cross chain shown in Fig. 3;

Fig. 6 is a top plan view of a cross chain consisting of a modified form of link;

Fig. 7 is a top plan view of a portion of the cross chain shown in Fig. 6, but on a larger scale;

Fig. 8 is a side view of the portion of cross chain shown in Fig. 7;

Fig. 9 is an end view of the link used in the construction shown in Fig. 6;

Fig. 10 is a top plan view of a portion of a cross chain consisting of a further modified form of link;

Fig. 11 is a side view of the portion of cross chain shown in Fig. 10;

Fig. 12 is an end view of the modified form of link used in the cross chain shown in Fig. 10;

Fig. 13 is a top plan view of a portion of a cross chain consisting of a further modified form of link;

Fig. 14 is a side elevation of the portion of cross chain shown in Fig. 13; and

Fig. 15 is an end view of the link used in the cross chain shown in Fig. 13.

For the purpose of disclosing my invention I have illustrated four different forms each of which embodies the same principles of invention.

In Figs. 1 to 5, I have disclosed one embodiment of my invention. I have illustrated a cross chain comprising links 16 connected by the usual hook links 17 to side chains 18.

Each of the links 16 comprises two substantially L-shaped members 20 and 21 each of which may have a long leg 22 and a short leg 23. The term "top" is used to refer to the face or side of the chain which rests against the tire. The legs 22 and 23 of each of the members 20 and 21 may extend at right angles to each other and may lie in the same plane. The members 20 and 21 are preferably secured together in planes which are angularly related, the short leg of each member crossing the top face of the long leg of the other member at a point close to the end of said long leg and secured thereto, and having its end project beyond the side of said long leg and in the assembled construction under the long leg of the adjacent link. This produces a construction in which short legs 23 diverge downwardly with respect to a plane extending at a slight angle to the plane transversely of the tire and the long legs 22 diverge with respect to a plane extending at a slight angle to the longitudinal central plane of the tire. This provides a cluster of anti-skidding and traction devices at the bottom or road side of the cross chain at the points of interconnection of the links extending in various directions so that they will dig into ice covered roads or the like. The ends of the long legs project downwardly a greater distance than the ends of the short legs as shown. The top or tire side of the links and the cross chain simulates that of the conventional curb links and cross chain, the links comprising lobes which rest on the tire. Rotational movement of a link with respect to an adjacent link is limited in one direction in substantially the same sense as in the conventional chain of twisted curb links and while such link may rotate freely in the opposite direction, the construction is such that there is less tendency for the links to intertwine or shorten the chain than in the case of the conventional form of curb link.

In Figs. 6, 7, 8 and 9, I have shown another form of link which also comprises L-shaped members which may be of the same shape as those shown in Figs. 1 to 5 but in which the short legs 23 are welded on the lower faces of the long legs 22. In this construction the ends of the legs function in substantially the same way as in the first modification shown in Figs. 1 to 5 but the ends of the short legs as shown, extend downwardly farther than the ends of the long legs. The relative degrees of projection may be readily varied in either form. Both forms simulate in appearance and function reinforced curb links.

In Figs. 10, 11 and 12, I have shown another form of link which comprises substantially L- shaped members having their long legs 22a and short legs 23a arranged at an obtuse angle. In a link so formed the short legs of adjacent links lie in planes extending substantially diagonally of the tire but function substantially the same as in the modification shown in Figs. 6 to 9.

In Figs. 13 to 15, I have disclosed another form of link which comprises substantially L-shaped members in which the long legs 22b and the short legs 23b are arranged at an acute angle. In this construction the short legs of adjacent links lie in planes extending diagonally of the tire but on the opposite side of the central plane of the tire with respect to the plane in which the short legs in the form shown in Figs. 10 to 12 extend. As the legs 22b and 23b extend at an acute angle with respect to each other, their connecting portions constitute eyes for connection with corresponding portions of adjacent links.

From the description it is apparent that my invention provides for a relatively light cross chain provided with very effective traction and anti-skidding lugs integral with the link, and that a cross chain so produced simulates in function and operation the conventional form of reinforced cross chain broadly but is cheaper to manufacture and is more effective to produce traction and prevent skidding.

Insofar as the principles of this invention are concerned, the members of the link may be of different instead of identical shape as shown, the legs of each member may be straight or curved, lie in the same or different planes, be of the same or different lengths with the long legs extending transversely of the link, and the legs of one member may be secured to opposite sides or to the same side of the legs of the other member to abut the legs of the other member endwise, or one member may be straight and the other comprise angularly related portions, and the members may be otherwise shaped and secured together in different relation. The expression L-shaped is intended to be generic to the forms disclosed and to all other equivalent forms, and is not to be limited to right angularly related straight legs of different lengths and lying in the same plane.

While I have disclosed but four embodiments of my invention, it is to be understood that various changes may be made within the principles of this invention and that I reserve the right to all such changes as fall within the principles of this invention and the scope of the appended claims.

I claim:

1. A link for an anti-skid chain consisting of a plurality of double ended members crossing each other at a plurality of points spaced from their ends and welded together, the intermediate portions of said members forming a closed loop and their ends constituting anti-skid devices.

2. A link for an anti-skid chain consisting of a plurality of double ended members crossing each other at points spaced from their ends and welded together, with the ends of each member lying on opposite sides of the ends of the other member.

3. A link for an anti-skid chain consisting of two L-shaped members with the legs of each member crossing and secured to the legs of the other member.

4. A link for an anti-skid chain consisting of two L-shaped members with the legs of each member crossing and secured to the legs of the other member, at least some of the ends of the legs projecting beyond the sides of the legs to which they are secured.

5. A link for an anti-skid chain consisting of two L-shaped members, each having straight legs arranged in a plane, the legs of each member crossing and secured to the legs of the other member.

6. A link for an anti-skid chain consisting of two L-shaped members, each having its legs arranged in a plane, said members being arranged in angularly related planes with the legs of each member crossing and secured to the legs of the other member.

7. A link for an anti-skid chain consisting of two L-shaped members, each having its legs arranged in a plane, said members being arranged in angularly related planes with the legs of each member crossing and secured to the legs of the other member at opposite sides of said other member.

8. A link for an anti-skid chain consisting of two L-shaped members secured together near their ends to provide downwardly diverging anti-skidding devices.

9. A link for an anti-skid chain consisting of two L-shaped members with the legs of each member crossing and secured to the legs of the other member and diverging downwardly as transversely and longitudinally diverging anti-skidding devices.

10. A link for an anti-skid chain consisting of two L-shaped members, angularly related, and each member having its legs crossing and secured to the legs of the other member, whereby one side of said link will simulate a plain curb link, and the other a reinforced curb link.

11. A link for an anti-skid chain consisting of two substantially L-shaped members each having short and long legs with the short and long legs of one member crossing respectively the long and short legs of the other member and secured thereto.

12. A link for an anti-skid chain consisting of two L-shaped members each comprising long and short legs with the short legs crossing the long legs on the tire side of the link.

13. A link for an anti-skid chain consisting of two L-shaped members each comprising long and short legs with the short legs crossing the long legs on the road side of the link.

14. A link for an anti-skid chain consisting of two substantially L-shaped members each having its legs arranged at an acute angle, the legs of each member crossing the legs of the other member and secured thereto.

15. A link for an anti-skid chain consisting of two L-shaped members each having long and short legs arranged at an acute angle, the short and long legs of each member crossing respectively the long and short legs of the other member and secured thereto.

16. A link for an anti-skid chain consisting of two L-shaped members each having long and short legs arranged at an obtuse angle, the short and long legs of each member crossing respectively the long and short legs of the other member and secured thereto.

17. A link for an anti-skid chain consisting of two substantially L-shaped members each having its legs arranged at an obtuse angle with the legs of each member crossing the legs of the other member and secured thereto.

GEORGE SMALL SCHMIDT.